United States Patent
Kuwabara et al.

[11] Patent Number: 5,611,945
[45] Date of Patent: Mar. 18, 1997

[54] RESISTANCE WELDING ELECTRODE

[75] Inventors: Mitsuo Kuwabara; Teruaki Yoshida; Tomohiko Ito, all of Sayama, Japan

[73] Assignee: Honda Giken Kogyo Kabushiki Kaisha, Japan

[21] Appl. No.: 319,635

[22] Filed: Oct. 7, 1994

[30] Foreign Application Priority Data

Oct. 8, 1993 [JP] Japan .................................. 5-252965

[51] Int. Cl.$^6$ ............................. B23K 35/02; B23K 11/30
[52] U.S. Cl. ......................................................... 219/119
[58] Field of Search ............................................. 219/119

[56] References Cited

U.S. PATENT DOCUMENTS

| | | |
|---|---|---|
| 4,591,687 | 5/1986 | Urech . |
| 4,843,206 | 6/1989 | Azuma et al. . |

FOREIGN PATENT DOCUMENTS

| | | | |
|---|---|---|---|
| 554720 | 6/1932 | Germany . | |
| 1938548 | 2/1970 | Germany | 219/119 |
| 58-159986 | 9/1983 | Japan . | |
| 61-95785 | 5/1986 | Japan | 219/119 |
| 61-108492 | 5/1986 | Japan | 219/119 |
| 62-286689 | 12/1987 | Japan | 219/119 |
| 64-78683 | 3/1989 | Japan . | |
| 1-62287 | 3/1989 | Japan . | |
| 3-230872 | 10/1991 | Japan . | |
| 4-339573 | 11/1992 | Japan . | |
| 5-92275 | 4/1993 | Japan . | |
| 6-210463 | 8/1994 | Japan . | |
| 941094 | 7/1982 | Russian Federation | 219/119 |
| 237902 | 4/1926 | United Kingdom . | |
| 387646 | 5/1931 | United Kingdom . | |
| 375836 | 4/1932 | United Kingdom . | |
| 620227 | 3/1949 | United Kingdom . | |
| 1177351 | 1/1970 | United Kingdom . | |

*Primary Examiner*—Teresa J. Walberg
*Assistant Examiner*—J. Pelham

[57] ABSTRACT

A resistance welding electrode for supplying a current to metal workpieces to weld the workpieces to each other has an electrode matrix of a copper alloy and a plurality of members disposed in the electrode matrix and having portions exposed on a surface of a tip end of the electrode matrix. The members are made of a material having an electric conductivity different from that of the electrode matrix. The exposed portions of the members have a total area which is in the range of 40 to 82% of the entire area of the tip end of the electrode matrix.

7 Claims, 2 Drawing Sheets

RESISTANCE WELDING ELECTRODE

BACKGROUND OF THE INVENTION

1. Field of the Invention:

The present invention relates to a resistance welding electrode for use in welding metal plates made of aluminum, magnesium, or an alloy thereof.

2. Description of the Related Art:

For welding metal plates, superposed regions of the metal plates are inserted between a pair of confronting electrodes of a welding apparatus, the electrodes are pressed against the superposed regions of the metal plates, and an electric energy is supplied through the electrodes to the superposed regions of the metal plates to heat the superposed regions due to the electric resistance of the metal plates for thereby fusing the metal plates to each other. Heretofore, electrodes which have been used to resistance-weld relatively soft metal workpieces such as metal plates made of aluminum, magnesium, or an alloy thereof have spherical convex tip ends for preventing deformations or cracks from being developed around the welded regions of the workpieces.

When metal plates made of aluminum, magnesium, or an alloy thereof are resistance-welded by the conventional electrode, however, the electrode is locally overheated, and a mass of molten metal of the metal plates tends to adhere to the overheated region of the electrode. Another problem is that the overheated region of the electrode itself is liable to be broken or damaged. As a result, the electrode cannot be used continuously for a long period of time.

The foregoing problems encountered in resistance-welding metal plates of aluminum, magnesium, or their alloy with the conventional resistance welding electrodes are considered to be caused by the presence of oxide films on the surfaces of the metal plates. The oxide films are irregular films produced by oxidization in the air of the surface of the metal plates, and act as an insulation.

When the electrodes are pressed against the metal plates covered with the oxide films, cracks are developed in weak or fragile areas, such as thin areas, of the oxide films. Since a current is supplied through the cracks to the metal plates, the welding current concentrates in the cracks, excessively heating the cracked areas of the oxide films.

There have heretofore been proposed resistance welding electrodes having a surface for contacting a metal plate to be welded which is machined to break an oxide film on the metal plate. For example, Japanese laid-open patent publication No. 58-159986 discloses a resistance welding electrodes including a surface for contacting a metal plate to be welded, the surface having a plurality of concentric grooves or a spiral groove defined therein and a triangular or trapezoidal cross-sectional shape. The resistance welding electrode includes a plurality of concentric ridges or a spiral ridge of a sharp edge disposed between the grooves or turns of the groove. There have also been proposed resistance welding electrodes having on their tip end a plurality of independent protrusions each having a distal end thinner than its proximal end, as disclosed in Japanese laid-open patent publications Nos. 4-339573 and 5-92275.

When the disclosed resistance welding electrodes are pressed against a metal plate for resistance-welding the same, an oxide film on the metal plate is broken in an entire area which is contacted by the resistance welding electrode, and the resistance welding electrode can be held in direct contact with a non-oxidized area of the metal plate. Since a current is supplied from the contact area, the current does not concentrate on a local area, thereby avoiding excessive heating of the metal plate.

However, the disclosed resistance welding electrodes are disadvantageous in that since they leave a tool mark indicative of the shape of the tip end of the electrode on the welded area, the welded workpiece has a poor appearance, and stresses tend to concentrate on the marked area, resulting in sudden or fatigue-induced breakage. When welded metal plates are to be plated or painted, the plated or painted coating is apt to become irregular in the marked area because of surface irregularities of the tool mark.

Japanese laid-open patent publications Nos. 1-62287 and 3-230872 disclose resistance welding electrodes in which a material, such as ceramics, W, Mo, or the like which has an electric conductivity lower than that of an electrode matrix is exposed in an area of the tip end of the electrode which is susceptible to damage. The disclosed resistance welding electrode has its service life increased by protecting the vulnerable area with the exposed material which has an electric conductivity lower than that of the electrode matrix.

The resistance welding electrode disclosed in Japanese laid-open patent publication No. 1-62287 is primarily designed for use in resistance welding of galvanized steel sheets. The resistance welding electrode disclosed in Japanese laid-open patent publication No. 3-230872 is primarily designed for use in projection welding of galvanized steel sheets. In the disclosed resistance welding electrodes, the material which has an electric conductivity lower than that of the electrode matrix is exposed on the area which can be spotted in advance as being open to damage in those specific welding processes. Consequently, those disclosed resistance welding electrodes are not effective to prevent damage due to excessive heating of unspecific areas such as fragile areas of irregular oxide films on the surfaces of metal plates which are made of aluminum, magnesium, or an alloy thereof.

SUMMARY OF THE INVENTION

It is therefore an object of the present invention to provide a resistance welding electrode for use in welding metal plates made of aluminum, magnesium, or an alloy thereof, the resistance welding electrode being capable of being used continuously for a long period of time without being damaged or fused to the metal plates, and of imparting an excellent appearance to a welded area of the metal plates.

To achieve the above object, there is provided in accordance with the present invention a resistance welding electrode for supplying a current to metal workpieces to weld the workpieces to each other, comprising an electrode matrix of a copper alloy and a plurality of members disposed in said electrode matrix and having portions exposed on a surface of a tip end of said electrode matrix, said members being made of a material having an electric conductivity different from that of said electrode matrix, the exposed portions of the members having a total area which is in the range of 40 to 82% of the entire area of the tip end of said electrode matrix.

With this arrangement, a welding current tends to flow more to the electrode matrix than to the material with its electric conductivity lower than that of the electrode matrix. Therefore, the welding current flows in scattered path through the resistance welding electrode. When the resistance welding electrode is pressed against a metal plate made of aluminum, magnesium, or its alloy and having an oxide film on its surface, the welding current is supplied to scattered areas on the surface of the metal plate against which the resistance welding electrode is pressed, and hence is prevented from concentrating on local areas.

The resistance welding electrode is more heated by the welding current at the material with the lower electric conductivity than the electrode matrix. Since the material with the lower electric conductivity has portions exposed on the surface of the tip end of the electrode matrix, and the total area of the exposed portions ranges from 40 to 82% of the area of the surface of the electrode tip end, the generated heat is scattered in a wide area thereby preventing the electrode tip end from being overheated locally. Consequently, the resistance welding electrode is prevented from being fused to the metal plate, and hence from being unduly damaged.

Even if the welding current concentrates in fragile areas of the oxide film, because the material with the lower electric conductivity is exposed on the surface of the electrode tip end, the welding current is scattered by the material with the lower electric conductivity. As a result, the heat produced by any localized concentration of the welding current is also scattered, avoiding undue fusion between the resistance welding electrode and the metal plate.

If the total area of the exposed portions of the material with the lower electric conductivity were smaller than 40% of the area of the electrode tip end, then the heat would not sufficiently be scattered. If the total area of the exposed portions of the material with the lower electric conductivity exceeded 82% of the area of the electrode tip end, then areas where the current flows would be relatively reduced, causing the welding current to become intensive excessively.

The exposed portions may surround portions of said electrode matrix on said surface of the tip end of the electrode matrix such that the surrounded portions of the electrode matrix are disposed independently of each other. Alternatively, the material having an electric conductivity lower than that of said electrode matrix may comprise a filamentary material, a fibrous material, or a granular material, and may be dispersed in said electrode matrix, said exposed portions of the members being exposed as lands on said surface of the tip end of said electrode matrix.

With the material with the lower electric conductivity being thus arranged, the welding current can be scattered without the need for any projections or recesses on the tip end of the electrode. The resistance welding electrode does not leave tool marks on the welded metal places, which can thus have an excellent appearance.

The material having an electric conductivity lower than that of said electrode matrix may comprise a material selected from the group consisting of silicon nitride, kaolinite, and alumina for dispersing the welding current. The material having an electric conductivity lower than that of said electrode matrix may alternatively comprise a material selected from the group consisting of a non-metallic inorganic material and a metal for dispersing the welding current.

The non-metallic inorganic material may comprise a material selected from the group consisting of C, SiC, TiC, TiN, $TiB_2$, and $TiO_2$. The metal may comprise a material selected from the group consisting of Ti, Fe, Co, Ni, Cr, and Ni—Cr alloy, Nb, Mo, and a Cr—Cu alloy having an electric conductivity lower than that of said electrode matrix.

A current is the movement of electrons. Electrons are negatively charged particles, and the current is defined as flowing in a direction opposite to the direction in which the electrons move. Since actual physical work is done by electrons, the resistance welding electrode is overheated intensively when it is used as an anode which receives electrons.

When the metal plates are resistance-welded with a direct current, the resistance welding electrode is used as an anode electrode for minimizing overheating of the resistance welding electrode. When the metal plates are resistance-welded with an alternating current, the resistance welding electrode is used as each of both electrodes for minimizing overheating of the resistance welding electrodes during operation of each of the resistance welding electrodes as the anode electrode. Such use of the resistance welding electrode is highly effective in preventing itself from being unduly damaged in a resistance welding process.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

First, a resistance welding electrode according to a first embodiment of the present invention will be described below with reference to FIGS. 1 and 2.

Figure 1:
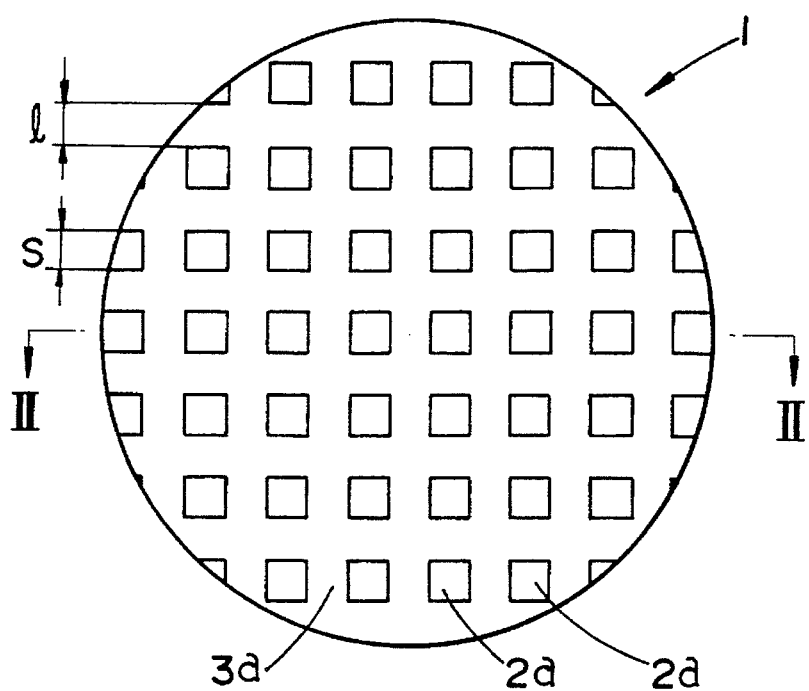
FIG. 1 is a plan view of a resistance welding electrode according to a first embodiment of the present invention.
Figure 2:
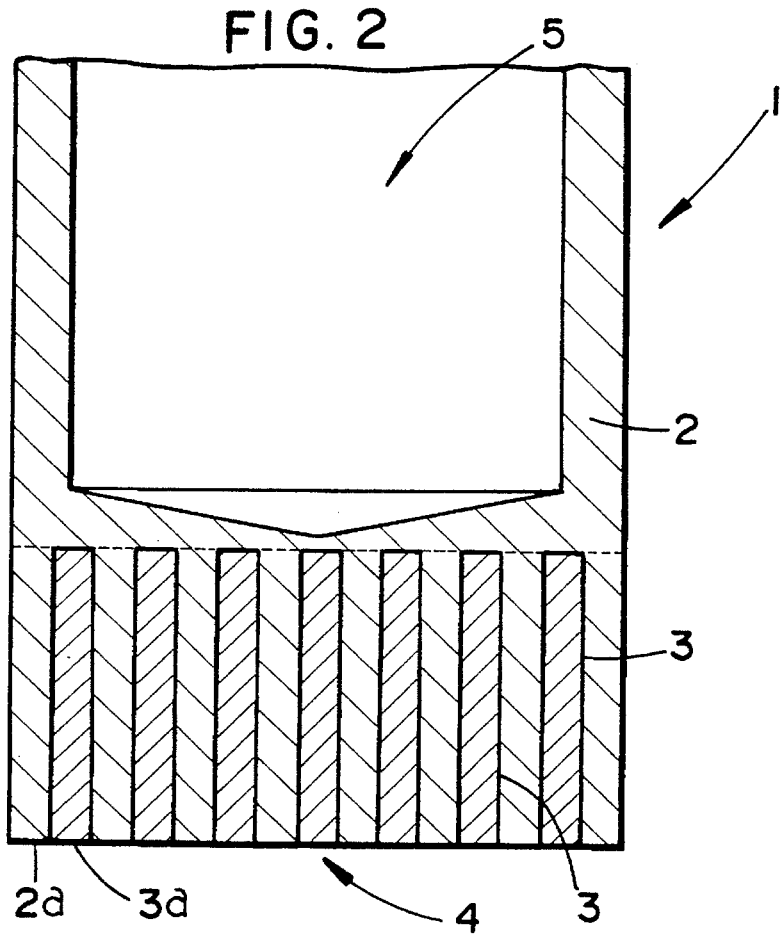
FIG. 2 is a cross-sectional view taken along line II—II of FIG. 1.

As shown in FIGS. 1 and 2, a resistance welding electrode 1 comprises an electrode matrix 2 made of a Cr—Cu alloy and a grid-shaped member 3 embedded in the electrode matrix 2 and having portions 3a exposed on the surface of a tip end 4 of the electrode matrix 2, the grid-shaped member 3 being made of a material having an electric conductivity lower than that of the electrode matrix 2. The exposed portions 3a surround a plurality of exposed portions 2a of the electrode matrix 2 on the tip end 4 such that the exposed portions 2a are disposed independently of each other. The total area of the exposed portions 3a of the grid-shaped member 3 is in the range of 40 to 82% of the entire area of the tip end 4 of the electrode matrix 2. As shown in FIG. 2 the resistance welding electrode 1 has a coolant hole 5 of a pre-determined length defined therein which extends axially from an opposite end toward the tip end 4, but terminates short of the tip end 4.

The resistance welding electrode 1 was manufactured as follows: 1.2 weight % of a powder of metallic chromium having particle diameters of 10 μm or less and an average particle diameter of 3 μm was mixed with 98.8 weight % of a powder of electrolytic copper having particle diameters of 44 μm or less and an average particle diameter of 20 μm, and the mixture was sintered into an electrode matrix 2 made of a Cr—Cu alloy having a diameter of 19 mm. Then, the electrode matrix 2 was cut into a length of 80 mm, and a tip end thereof was machined to form a grid-shaped pattern of grooves in its tip end. The grid-shaped pattern of grooves was then filled with kaolinite as a material having an electric conductivity lower than that of the electrode matrix 2, thus producing a resistance welding electrode 1 with a grid-shaped member 3 of kaolinite embedded therein.

Then, plates of an aluminum alloy (AP5052, thickness: 2.5 mm) were welded with a direct current by an anode electrode comprising the resistance welding electrode 1 and a cathode electrode comprising a conventional resistance welding electrode made of a Cr—Cu alloy only with no exposed material having an electric conductivity lower than that of an electrode matrix on the tip end. The aluminum-alloy plates were welded with a direct current of 38 kA in 8 cycles while the electrodes were being pressed against the aluminum-alloy plates under a pressure of 800 kgf.

In this embodiment, different resistance welding electrodes with varying widths s of exposed portions 2a and widths l of exposed portions 3a were employed, with the total area of the exposed portions 3a of the grid-shaped member 3 on the tip end 4 being in the range of from 40 to 82% of the total area of the exposed portions 2a of the electrode matrix 2 on the tip end 4 of the resistance welding electrode 1. The widths s, l, the ratios of the total area of the exposed portions 3a to the total area of the exposed portions 2a, and welding counts are shown in Table 1 below.

TABLE 1

| s (mm) | l (mm) | Ratio between total areas of exposed portions 3a, 2a | Welding count |
|---|---|---|---|
| 2 | 1 | 58 | 390 |
| 2 | 2 | 73 | 820 |
| 2 | 3 | 82 | 690 |
| 3 | 1 | 46 | 480 |
| 3 | 2 | 62 | 960 |
| 3 | 3 | 78 | 860 |
| 4 | 2 | 40 | 620 |

The welding count represents the number of times that the resistance welding electrode can be used to successively weld the aluminum-alloy plates. It can be seen from Table 1 that the resistance welding electrode 1 according to the present invention can be used continuously for a long period of time.

A resistance welding electrode according to a second embodiment of the present invention will be described below.

In the second embodiment, there were manufactured resistance welding electrodes 1 having, as shown in FIGS. 1 and 2, respective electrode matrixes 2 of a Cr—Cu alloy and grid-shaped members 3 embedded respectively in the electrode matrixes 2 and having an electric conductivity lower than that of the electrode matrixes 2, the grid-shaped members 3 being made of insulations of silicon nitride, kaolinite, and alumina, non-metallic inorganic materials of SiC, TiN, and $TiB_2$, metals of Ti, stainless steel (SUS304), steel (SCM420), Co, Ni (u520), and a sintered Cr—Cu alloy, the grid-shaped members 3 having exposed areas 3a whose total area was 70% of the area of the tip end 4 of the electrode matrix.

Then, plates of an aluminum alloy (A5052, O material, thickness: 2 mm) were welded with a direct current of 18 kA in 8 cycles by an anode electrode comprising each of the resistance welding electrodes 1 and a cathode electrode comprising a conventional resistance welding electrode made of a Cr—Cu alloy only with no exposed material having an electric conductivity lower than that of an electrode matrix on the tip end, while the electrodes were being pressed against the aluminum-alloy plates under a pressure of 750 kgf. The results of the welding processes are given in Table 2 below.

For comparison, the aluminum-alloy plates were also resistance-welded with a direct current using conventional resistance welding electrodes as anode and cathode electrodes, the conventional resistance welding electrodes being made of a Cr—Cu alloy only with no exposed material having an electric conductivity lower than that of an electrode matrix on the tip end. The results of the above welding processes are also given in Table 2 below. When the conventional resistance welding electrodes were used as anode and cathode electrodes, the aluminum-alloy plates were not welded unless a welding direct current of 32 kA was supplied in 15 cycles.

TABLE 2

| | Material with electric conduc- | | Effective welding count | |
|---|---|---|---|---|
| Electrode matrix | tivity lower than electrode matrix | Successive welding count | Automobile industry | Aircraft industry |
| (Inventive Example) | | | | |
| Cr—Cu | Silicon nitride | 840 | 430 | 200 |
| " | Kaolinite | 730 | 420 | 200 |
| " | Alumina | 750 | 350 | 150 |
| " | SiC | 780 | 380 | 180 |
| " | TiN | 740 | 370 | 170 |
| " | $TiB_2$ | 820 | 420 | 200 |
| " | Metal Ti | 520 | 210 | 110 |
| " | Stainless steel (SUS304) | 750 | 250 | 150 |
| " | Steel (SCM420) | 620 | 330 | 130 |
| " | Co | 490 | 300 | 120 |
| " | Ni (u520) | 480 | 300 | 100 |
| " | Cr—Cu | 280 | 75 | 12 |
| (Comparative Example) Cr—Cu | — | 180 | 15 | 1 |

In Table 2, the successive welding count represents a welding count which satisfies an ensured class-A nugget size of $5 t^{1/2}$ (t is the thickness of the aluminum-alloy plates) and allows a class-A tensile shear strength of 750 kgf to be successively obtained, and the effective welding count represents a welding count which is adequate in the automobile and aircraft industries. The effective welding count adequate in the automobile industry assures that the welded aluminum-alloy plates are free of appearance problems. The effective welding count adequate in the aircraft industry assures that no external and internal expulsions and surface flashes and no burning of tool marks are recognized on the welded aluminum-alloy plates.

As can be seen from Table 2, the resistance welding electrode 1 according to this embodiment achieves a successive weld count and an effective weld count which are much better than those of the conventional resistance welding electrode, has an increased service life, and hence can be used continuously for a long period of time. As shown in FIG. 2, the exposed portions 3a of the grid-shaped member 3 lie flush with the tip end 4 of the electrode matrix 2 in the resistance welding electrode 1 according to this embodiment. Therefore, the resistance welding electrode 1 according to this embodiment does not leave a tool mark on the welded area of the aluminum-alloy plates, and the welded aluminum-alloy plates have an excellent appearance.

If the resistance welding electrode 1 is used beyond the effective welding count, then the welded workpieces will not have an excellent appearance. This appears to result from scales deposited on the tip end 4. Because the tip end 4 is of a flat shape, such deposited scales can easily be removed by a brush or the like to recover the welding capability of the resistance welding electrode 1.

In the first and second embodiments, the grid-shaped pattern of grooves for being filled with the grid-shaped member 3 is formed by machining the electrode matrix 2. However, the grid-shaped pattern of grooves may be produced by an extrusion process.

A resistance welding electrode according to a third embodiment of the present invention will be described below with reference to FIGS. 3 and 4.

Figure 3:
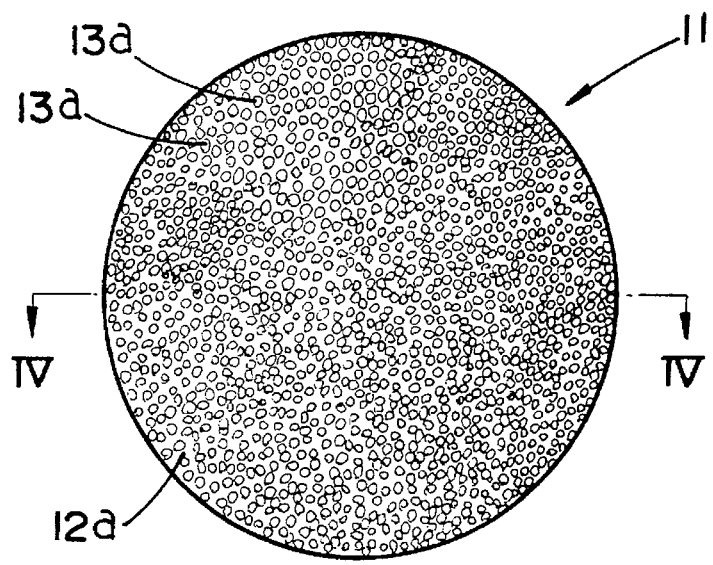
FIG. 3 is a plan view of a resistance welding electrode according to a third embodiment of the present invention.
Figure 4:
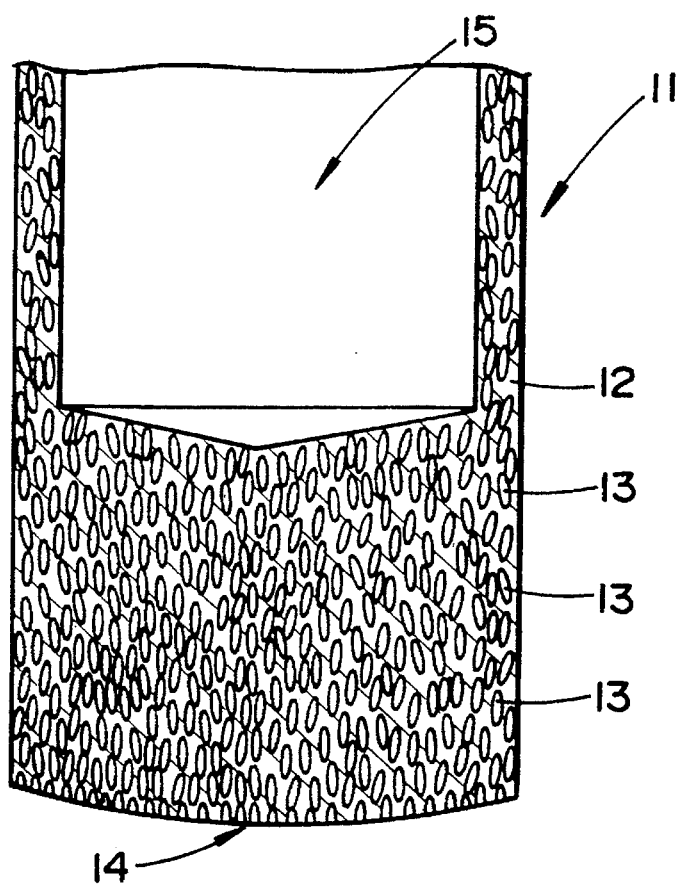
FIG. 4 is a cross-sectional view taken along line IV—IV of FIG. 3.

As shown in FIGS. 3 and 4, a resistance welding electrode 11 comprises an electrode matrix 12 made of a Cr—Cu alloy and filamentary, fibrous, or granular members 13 dispersed in the electrode matrix 12 and having portions 13a exposed as lands on the surface of a tip end 14 of the electrode matrix 12, the filamentary, fibrous, or granular members 13 being made of a material having an electric conductivity lower than that of the electrode matrix 12. The total area of the exposed portions 13a of the members 13 is in the range of 60 to 80% of the entire area of the tip end 14 of the electrode matrix 12. As shown in FIG. 4 the resistance welding electrode 11 has a coolant hole 15 of a predetermined length defined therein which extends axially from an opposite end toward the tip end 14, but terminates short of the tip end 14.

If the members 13 which have an electric conductivity lower than that of the electrode matrix 12 are filamentary, then the filamentary members 13 extend in the direction in which a current passes through the electrode 11. If the members 13 which have an electric conductivity lower than that of the electrode matrix 12 are fibrous, then the fibrous members 13 extend in the direction in which a current passes through the electrode 11. The members 13 are oriented axially in the vicinity of the tip end 14.

Processes of manufacturing the resistance welding electrode 11 will be described below.

If the members 13 are made of a fibrous material, then the resistance welding electrode 11 is manufactured as follows: The fibrous material comprises carbon fibers, alumina fibers, and SiC whiskers. The alumina fibers are an insulation, and the carbon fibers and SiC whiskers are a non-metallic inorganic material.

60 to 80 weight % of the fibrous material is added to a powder of a 0.8 Cr—Cu alloy having an average particle diameter of 20 µm, and the mixture is temporarily shaped into a cylindrical billet having a diameter of 200 mm and a length of 600 mm. Then, the billet is sintered at 1000° C.

The sintered billet is extruded at a temperature of about 800° C. under a pressure ranging from 1500 to 2500 tons by a hot hydrostatic extrusion machine, producing an electrode blank having a diameter of 20 mm. While the billet is being thus extruded, the fibrous material is highly compacted and oriented in the billet as described above.

The electrode blank of a diameter of 20 mm is then cut into a length of 80 mm, exposing the members 13 on its cut surface.

The cut surface of the electrode blank where the members 13 are exposed is machined into a spherical convex shape with a radius of curvature of 150, thus producing the tip end 14 of the electrode 11. A coolant hole 5 having a diameter of 16 mm and a depth of 65 mm is formed in the electrode blank from the opposite end thereof, which is then machined into a final diameter of 19 mm. As a result, the resistance welding electrode 11 as shown in FIGS. 3 and 4 is produced.

If the members 13 are made of a granular material, then the resistance welding electrode 11 is manufactured as follows: The granular material comprise $TiO_2$ particles having an average particle diameter of 0.2 µm, alumina particles having an average particle diameter of 3.0 µm, and TiC particles having an average particle diameter of 14.8 µm. The alumina particles are an insulation, and the $TiO_2$ particles and TiC particles a non-metallic inorganic material.

60 to 80 weight % of the granular material is added to a powder of a 0.8 Cr—Cu alloy having an average particle diameter of 20 µm only in a region which will be formed into the tip end 14 of the electrode 11, and the mixture is temporarily shaped into an electrode blank having a diameter of 24 mm.

The electrode blank is then sintered, swaged, and thereafter cut and shaped into the resistance welding electrode 11 as shown in FIGS. 3 and 4 in the same manner as the electrode blank in which the members 13 are made of a fibrous material.

If the members 13 are made of a filamentary material, then the resistance welding electrode 11 is manufactured as follows: The filamentary material may be a Cr filamentary material having a filament diameter of 2 mm and an Ni—Cr filamentary material having a filament diameter of 2 mm.

60 to 80 weight % of the filamentary material is added to a powder of a 0.5 Cr—Cu alloy having an average particle diameter of 20 µm only in a region which will be formed into the tip end 14 of the electrode 11, and the mixture is pressed so as to be temporarily shaped into an electrode blank having a diameter of 24 mm. While the mixture is being pressed, the filamentary material is oriented so as to extend in the direction in which a current will flow through the electrode.

The electrode blank is then sintered and thereafter cut and shaped into the resistance welding electrode 11 as shown in FIGS. 3 and 4 in the same manner as the electrode blank in which the members 13 are made of a fibrous material.

If the members 13 are made of a granular material which will be processed into a fibrous state, then the resistance welding electrode 11 is manufactured as follows: The granular material may be Cr particles having an average particle diameter of 5 µm, Nb particles having an average particle diameter of 5 µm, or Mo particles having an average particle diameter of 5 µm.

60 to 80 weight % of the granular material is added to a powder of a 0.5 Cr—Cu alloy having an average particle diameter of 20 µm only in a region which will be formed into the tip end 14 of the electrode 11, and the mixture is temporarily shaped into a cylindrical billet having a diameter of 400 mm and a length of 600 mm.

The billet is then sintered and drawn into an electrode blank having a diameter of 20 mm. While the billet is being thus drawn, the particles of the granular material are also drawn to a percentage of 95%, so that they are converted into a fibrous state in the electrode blank.

The electrode blank is then cut and shaped into the resistance welding electrode 11 as shown in FIGS. 3 and 4 in the same manner as the electrode blank in which the members 13 are made of a fibrous material.

Then, plates of an aluminum alloy (A5052, O material, thickness: 2 mm) were welded with a direct current of 18 kA in 8 cycles by an anode electrode comprising each of the resistance welding electrodes 1 and a cathode electrode comprising a conventional resistance welding electrode made of a Cr—Cu alloy only with no exposed material having an electric conductivity lower than that of an electrode matrix on the tip end, while the electrodes were being pressed against the aluminum-alloy plates under a pressure of 750 kgf. The results of the above welding processes are given in Table 3 below.

For comparison, the aluminum-alloy plates were also resistance-welded with a direct current using conventional resistance welding electrodes as anode and cathode electrodes, the conventional resistance welding electrodes being made of a Cr—Cu alloy only with no exposed material having an electric conductivity lower than that of an electrode matrix on the tip end. The results of the above welding processes are also given in Table 3 below. When the conventional resistance welding electrodes were used as anode and cathode electrodes, the aluminum-alloy plates were not welded unless a welding direct current of 32 kA was supplied in 15 cycles.

TABLE 3

| Electrode matrix | Material with electric conductivity lower than electrode matrix | Successive welding count | Effective welding count | |
|---|---|---|---|---|
| | | | Automobile industry | Aircraft industry |
| (Inventive Example) | | | | |
| 0.8 Cr—Cu | Carbon fibers | 580 | 90 | 40 |
| " | Alumina fibers | 720 | 110 | 60 |
| " | SiC whiskers | 810 | 140 | 80 |
| " | TiO$_2$ particles | 540 | 115 | 70 |
| " | Alumina particles | 570 | 110 | 60 |
| " | TiC particles | 550 | 95 | 60 |
| 0.5 Cr—Cu | Cr filamentary material | 530 | 90 | 40 |
| " | Ni—Cr filamentary material | 560 | 60 | 40 |
| " | Cr particles | 480 | 70 | 35 |
| " | Nb particles | 470 | 60 | 40 |
| " | Mo particles | 450 | 50 | 30 |
| (Comparative Example) Cr—Cu | — | 180 | 15 | 1 |

In Table 3, the successive welding count and the effective welding count have the same meanings as those given above with respect to Table 2. The resistance welding electrode 11 according to this embodiment operates in a manner similar to the resistance welding electrode 1 according to the second embodiment. The resistance welding electrode 11 according to this embodiment achieves a successive weld count and an effective weld count which are much better than those of the conventional resistance welding electrode, has an increased service life, and hence can be used continuously for a long period of time. As shown in FIG. 4, the exposed portions 13a of the members 3 lie flush with the tip end 14 of the electrode matrix 12 in the resistance welding electrode 11, and the tip end 14 is of a spherical convex shape. Therefore, the resistance welding electrode 11 does not leave a tool mark on the welded area of the aluminum-alloy plates, and the welded aluminum-alloy plates have an excellent appearance.

A resistance welding electrode according to a fourth embodiment of the present invention will be described below.

In each of the above embodiments, the resistance welding electrode is used as an anode electrode in resistance-welding workpieces or metal plates with a direct current. However, the resistance welding electrode according to each of the embodiments may be used to resistance-weld work pieces or metal plates with an alternating current. In the fourth embodiment, a resistance welding electrode is used as each of both electrodes in a resistance welding process which employs an alternating current.

In the fourth embodiment, a resistance welding electrode comprises an electrode matrix 2 (see FIGS. 1 and 2) made of a Cr—Cu alloy and grid-shaped members 3 embedded in the electrode matrix 2 and having portions 13a exposed as lands on the surface of a tip end 4 of the electrode matrix 2 as according to the second embodiment, the grid-shaped members 3 being made of a material having an electric conductivity lower than that of the electrode matrix 2. The material of the grid-shaped members 3 comprises an insulation of silicon nitride, kaolinite, and alumina, a nonmetallic inorganic material of TiB$_2$, and a metal of steel, Ni, and a sintered Cr—Cu alloy. The total area of the exposed portions 3a of the members 3 is in the range of 70% of the entire area of the tip end 4 of the electrode matrix 2.

Plates of an aluminum alloy (A5052, O material, thickness: 2 mm) were welded with an alternating of 18 kA in 8 cycles by electrodes comprising the resistance welding electrodes 1, while the electrodes were being pressed against the aluminum-alloy plates under a pressure of 750 kgf. The results of the welding processes are given in Table 4 below.

For comparison, the aluminum-alloy plates were also resistance-welded with an alternating current using conventional resistance welding electrodes as both electrodes, the conventional resistance welding electrodes being made of a Cr—Cu alloy only with no exposed material having an electric conductivity lower than that of an electrode matrix on the tip end. The results of the above welding processes are also given in Table 4 below. When the conventional resistance welding electrodes were used as both electrodes, the aluminum-alloy plates were not welded unless a welding alternating current of 38 kA was supplied in 15 cycles.

TABLE 4

| Electrode matrix | Material with electric conductivity lower than electrode matrix | Successive welding count | Effective welding count | |
|---|---|---|---|---|
| | | | Automobile industry | Aircraft industry |
| (Inventive Example) | | | | |
| Cr—Cu | Silicon nitride | 700 | 400 | 180 |
| " | Kaolinite | 750 | 400 | 190 |
| " | Alumina | 700 | 330 | 140 |
| " | TiB$_2$ | 750 | 400 | 170 |
| " | Steel (SCM420) | 600 | 280 | 110 |
| " | Ni (u520) | 500 | 200 | 80 |
| " | Cr—Cu | 260 | 65 | 8 |
| (Comparative Example) Cr—Cu | — | 200 | 12 | 1 |

In Table 4, the successive welding count and the effective welding count have the same meanings as those given above with respect to Table 2. It can be seen from Table 4 that the resistance welding electrode 1 according to the second embodiment used as each of the electrodes in resistance welding processes using an alternating current according to this embodiment achieves a successive weld count and an effective weld count which are much better than those of the conventional resistance welding electrode used as each of both electrodes, has an increased service life, and hence can be used continuously for a long period of time.

Plates of an aluminum alloy (A5052, O material, thickness: 2 mm) were welded with an alternating of 18 kA in 8 cycles by electrodes comprising the resistance welding electrodes 11 each comprising an electrode matrix 12 (see FIGS. 3 and 4) made of a Cr—Cu alloy and filamentary, fibrous, or granular members 13 dispersed in the electrode matrix 12 and having portions 13a exposed as lands on the surface of a tip end 14 of the electrode matrix 12, as according to the third embodiment, the filamentary, fibrous, or granular members 13 being made of a material having an electric conductivity lower than that of the electrode matrix 12. The fibrous members 13 were made of alumina fibers, the granular members 13 of alumina particles, Cr particles, and Mo particles, and the filamentary members 13 of a Cr filamentary material. The electrodes were pressed against the aluminum-alloy plates under a pressure of 750 kgf. The results of the welding processes are given in Table 5 below.

For comparison, the aluminum-alloy plates were also resistance-welded with an alternating current using conventional resistance welding electrodes as both electrodes, the conventional resistance welding electrodes being made of a Cr—Cu alloy only with no exposed material having an electric conductivity lower than that of an electrode matrix on the tip end. The results of the welding processes are also given in Table 5 below. When the conventional resistance welding electrodes were used as both electrodes, the aluminum-alloy plates were not welded unless a welding alternating current of 38 kA was supplied in 15 cycles.

For further comparison, the aluminum-alloy plates were also resistance-welded with an alternating current using, as one electrode, a resistance welding electrode having an electrode matrix 12 made of a Cr—Cu (0.8 Cr—Cu) alloy and fibrous members 13 of alumina fibers dispersed in the electrode matrix 12 and having portions 13a exposed as lands on the surface of a tip end 14 of the electrode matrix 12, the fibrous members 13 being made of a material having an electric conductivity lower than that of the electrode matrix 12, and, as the other electrode, the conventional resistance welding electrode. The results of the above welding processes are also given in Table 5 below. When the conventional resistance welding electrode was used as the other electrode, the aluminum-alloy plates were not welded unless a welding alternating current of 26 kA was supplied in 8 cycles

TABLE 5

| Electrode matrix | Material with electric conductivity lower than electrode matrix | Successive welding count | Effective welding count Automobile industry | Effective welding count Aircraft industry |
| --- | --- | --- | --- | --- |
| (Inventive Example) 0.8 Cr—Cu | Alumina fibers (both electrodes) | 600 | 100 | 50 |
| (Comparative Example) 0.8 Cr—Cu Inventive Example) | Alumina fibers (only one electrode) | 250 | 40 | 15 |
| 0.8 Cr—Cu | Alumina particles | 480 | 80 | 40 |
| 0.5 Cr—Cu | Cr filamentary material | 500 | 80 | 30 |
| " | Cr particles | 450 | 50 | 20 |
| " | Mo particles | 400 | 30 | 20 |
| (Comparative Example) Cr—Cu | (both electrodes) | 200 | 12 | 1 |

In Table 5, the successive welding count and the effective welding count have the same meanings as those given above with respect to Table 2. It can be seen from Table 5 that the resistance welding electrode 11 according to the third embodiment used as each of the electrodes in resistance welding processes using an alternating current according to this embodiment operates in a manner similar to the resistance welding electrode 1 according to the second embodiment used as each of the electrodes in resistance welding processes using an alternating current according to the fourth embodiment, and achieves a successive weld count and an effective weld count which are much better than those of the conventional resistance welding electrode used as each of both electrodes, has an increased service life, and hence can be used continuously for a long period of time.

When the resistance welding electrode 11 according to the third embodiment (with alumina fibers dispersed in the electrode matrix 12 made of a 0.8 Cr—Cu alloy) is used as one of the electrodes and the conventional resistance welding electrode as the other electrode in a resistance welding process using an alternating current, the successive welding count falls from 600 to 250, the effective welding count falls from 100 to 40 for the automobile industry, and the effective welding count falls from 50 to 15 for the aircraft industry, as compared with the present invention in which the resistance welding electrode 11 is used as each of both electrodes. The reason for this is as follows: Since an alternating current is supplied alternately from both electrodes, no problem arises when the resistance welding electrode 11 according to this embodiment receives electrons, but the resistance welding electrode and the metal plate are fused to each other when the conventional resistance welding electrode receives electrons.

When the resistance welding electrode 11 according to the third embodiment is used as one of the electrodes and the conventional resistance welding electrode as the other electrode in a resistance welding process using an alternating current, better results are obtained than when the conventional resistance welding electrode is used as each of both electrodes. Using the resistance welding electrode 11 according to the third embodiment as each of both electrodes can accomplish much better results.

In each of the embodiments, the electrode matrix is made of a Cr—Cu alloy. However, the electrode matrix may be made of Cu only, or an alloy containing Cu, e.g., an Ag—Cu alloy, a Cu—W—Ag alloy, a Cu—Cd alloy, a Cu—Zr alloy, a Cu—Zr—Cr alloy, a Cu—Nb alloy, a Cu—Cr—Nb alloy, or an Al$_2$O$_3$—Cu alloy.

Although certain preferred embodiments of the present invention has been shown and described in detail, it should be understood that various changes and modifications may be made therein without departing from the scope of the appended claims.

What is claimed is:

1. A resistance welding electrode for supplying a current to metal workpieces to weld the workpieces to each other, comprising:

an electrode matrix of a copper alloy; and a plurality of members disposed in said electrode matrix and having portions exposed on a tip end surface of said electrode matrix, said members being made of a material having an electric conductivity lower than that of said electrode matrix, the exposed portions of the members having a total area which is in the range of 40 to 82% of the entire area of the tip end of said electrode matrix, wherein said material having an electric conductivity lower than that of said electrode matrix comprises one of a filamentary material, a fibrous material, and a granular material, and is disposed in said electrode matrix, said exposed portions of the members being exposed as lands on said surface of the tip end of said electrode matrix.

2. The resistance welding electrode according to claim 1, wherein said material having an electric conductivity lower than that of said electrode matrix comprises a material selected from the group consisting of silicon nitride, kaolinite, and alumina.

3. The resistance welding electrode according to claim 1, wherein said material having an electric conductivity lower than that of said electrode matrix comprises a material selected from the group consisting of a non-metallic inorganic material and a metal.

4. The resistance welding electrode according to claim 3, wherein said non-metallic inorganic material comprises a material selected from the group consisting of C, SiC, TiC, TiN, $TiB_2$, and $TiO_2$.

5. The resistance welding electrode according to claim 3, wherein said metal comprises a material selected from the group consisting of Ti, Fe, Co, Ni, Cr, and Ni—Cr alloy, Nb, Mo and a Cr—Cu alloy having an electrode conductivity lower than that of said electrode matrix.

6. The resistance welding electrode according to claim 1, wherein said electrode comprises an anode electrode and further comprising means for supplying a direct current through said anode electrode when said metal workpieces are resistance-welded.

7. The resistance welding electrode according to claim 1, further comprising means for supplying an alternating current through said electrode when the metal workpieces are resistance-welded.

\* \* \* \* \*